(12) United States Patent
Yu et al.

(10) Patent No.: US 7,170,311 B2
(45) Date of Patent: Jan. 30, 2007

(54) TESTING METHOD FOR LCD PANELS

(75) Inventors: Chih-Lung Yu, Tainan Hsien (TW);
Chia-Yu Fan, Taoyuan Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/195,676

(22) Filed: Aug. 3, 2005

(65) Prior Publication Data
US 2006/0028232 A1   Feb. 9, 2006

(30) Foreign Application Priority Data
Aug. 4, 2004   (TW) ............................. 93123388 A

(51) Int. Cl.
*G01R 31/26*   (2006.01)
*G01R 31/28*   (2006.01)
*G01R 31/02*   (2006.01)

(52) U.S. Cl. ................... 324/770; 324/158.1; 349/139; 438/17

(58) Field of Classification Search ................ 324/770; 349/139
See application file for complete search history.

(56) References Cited

U.S. PATENT DOCUMENTS

| 6,577,367 | B2 | 6/2003 | Kim | |
| 6,677,171 | B1 * | 1/2004 | Nagata et al. | 438/17 |
| 6,759,867 | B2 * | 7/2004 | Sohn | 324/770 |
| 6,825,911 | B2 * | 11/2004 | Lee et al. | 349/192 |

* cited by examiner

*Primary Examiner*—Vinh Nguyen
*Assistant Examiner*—Emily Y Chan
(74) *Attorney, Agent, or Firm*—Birch, Stewart, Kolasch & Birch, LLP

(57) ABSTRACT

The present invention provides a testing method for LCD panels. First, a plurality of panels are formed on a substrate. Each panel has first conducting lines and second conducting lines, which are perpendicular to each other. The first conducting lines and the second conducting lines of adjacent panels are electrically connected, respectively. Finally, all panels on the substrate are simultaneously tested by a testing circuit.

20 Claims, 5 Drawing Sheets

TESTING METHOD FOR LCD PANELS

RELATED APPLICATIONS

The present application is based on, and claims priority from, Taiwan Application Serial Number 93123388, filed Aug. 4, 2004, the disclosure of which is hereby incorporated by reference herein in its entirety.

BACKGROUND

1. Field of Invention

The present invention relates to a testing method for liquid crystal display (LCD) panels. More particularly, the present invention relates to an improved testing method for LCD panels.

2. Description of Related Art

In the manufacturing process of LCD panels, many panels are formed simultaneously on a large substrate. After forming the panels, each panel is tested one by one to determine whether the function of each panel manufactured is normal. When the test is completed, the substrate is segmented into individual panels. FIG. 1 shows a layout of panels formed on a large glass substrate in the prior art. On the glass substrate 10 are four panels 12 having the same size. Each panel 12 has plural vertical source lines 14 and plural horizontal gate lines 16. The intersections of these source lines 14 and gate lines 16 constitute a pixel array of LCD 12.

Before segmenting the glass substrate 10 into individual panels 12, the panels 12 should be tested to determine whether each panel 12 functions normally. The test is performed by using a testing circuit that is the same size as the panel 12. The testing circuit comprises many probes, wherein the position of each probe respectively corresponds to each source pad 13 of the source lines 14 and each gate pad 15 of the gate lines 16. By contacting the probes of the testing circuit with the source pads 13 and the gate pads 15 of the panel, and then testing each source pad 13 or gate pad 15, whether each source line 14 or gate line 16 functions normally or not can be determined.

When the testing circuit completes the test on one panel 12, it moves to another panel 12 on the glass substrate 10 until all of the panels 12 are tested. FIG. 1 shows, for example, a glass substrate 10 comprising four panels 12. In this case, the testing circuit is moved to these four panels 12 by a robot arm to test each panel 12 one by one.

However, such a testing method is time-consuming since the testing circuit is moved to and positioned on each panel that needs to be tested. When the number of the panels on the substrate increases, the testing time increases. Furthermore, the testing time increases significantly when the panels on the substrate are of different sizes. This is because different-sized panels need to be tested by using correspondingly different-sized testing circuits. The testing circuit needs to be changed during the test, and thus the testing time increases.

FIG. 2 shows a layout of a glass substrate 20 comprising panels with different sizes. The glass substrate 20 comprises large-sized panels 22a and small-sized panels 22b. When conducting the test, one uses testing circuits sized correspondingly to those of panels 22a and panels 22b and test them separately. Changing the testing circuit results in an increase of the testing time. Moreover, if the substrate comprises several different-sized panels, testing circuits of various sizes are needed which raises the testing cost.

For the foregoing reasons, there is a need for an improved testing method for LCD panels to reduce the time for moving the testing circuit and thereby speed up the test on all the panels on the substrate. Further, there is a need for an improved testing method for LCD panels which can be applied to a substrate having various sizes of panels to reduce the overall testing time.

SUMMARY

In one aspect, the present invention provides a testing method for LCD panels which can simultaneously test all the panels on a substrate and shorten testing time.

In accordance with the foregoing and other aspects, the present invention provides a testing method for LCD panels. A plurality of panels are formed on a substrate. Each panel has first conducting lines and second conducting lines, which are perpendicular to each other. The first conducting lines and second conducting lines of adjacent panels are electrically connected, respectively. Finally, all panels on the substrate are tested by a testing circuit simultaneously.

According to the testing method of the present invention for LCD panels, one can simultaneously test various panels of the same or different sizes and thereby simplify the test, reduce the time for moving the testing circuit, shorten the testing and manufacturing time, raise the production rate and yield, and lower the cost for testing facilities.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE PREFERRED EMBODIMENTS

Figure 1:
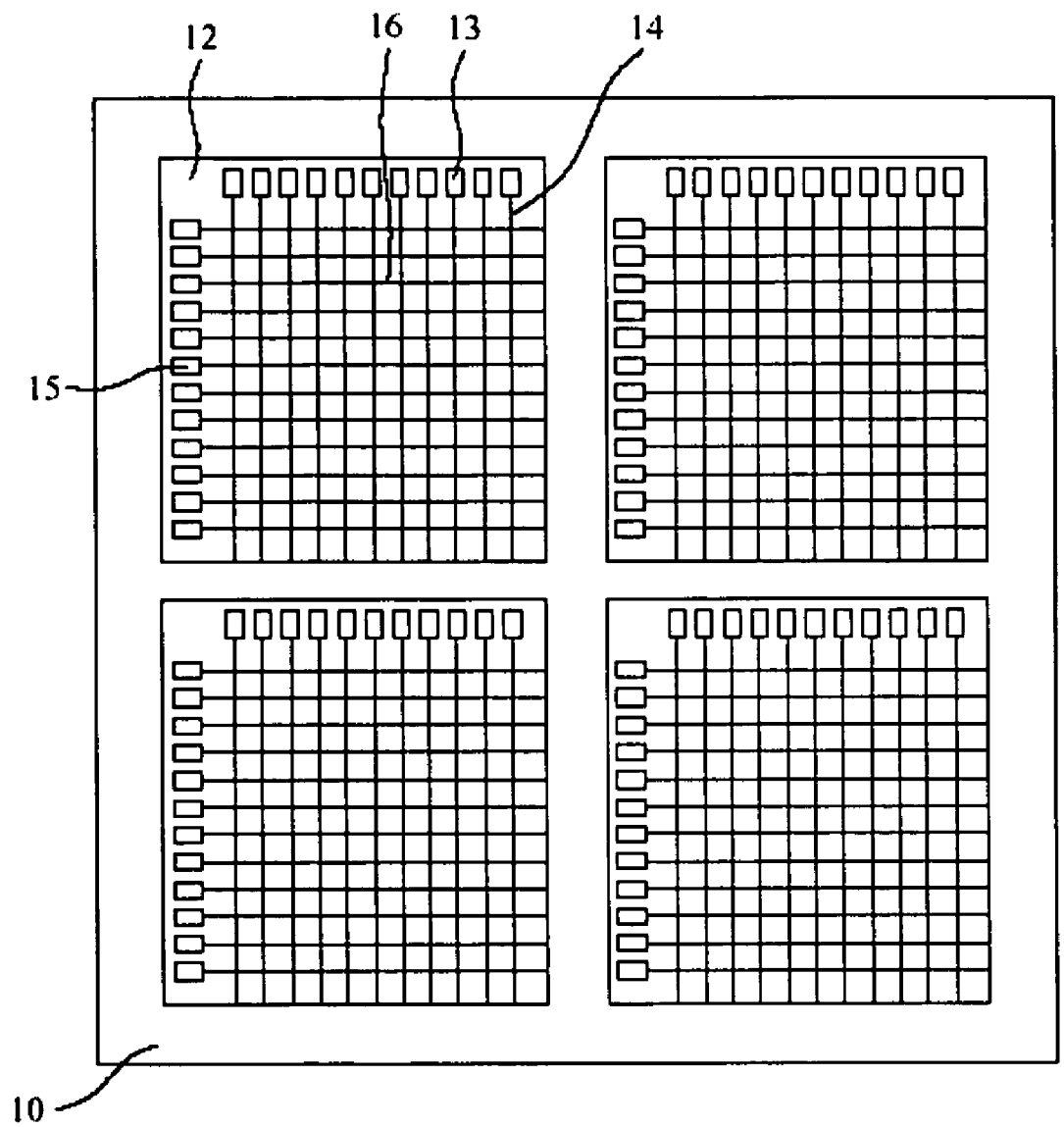
FIG. 1 is a layout for LCD panels on a substrate in the prior art.
Figure 2:
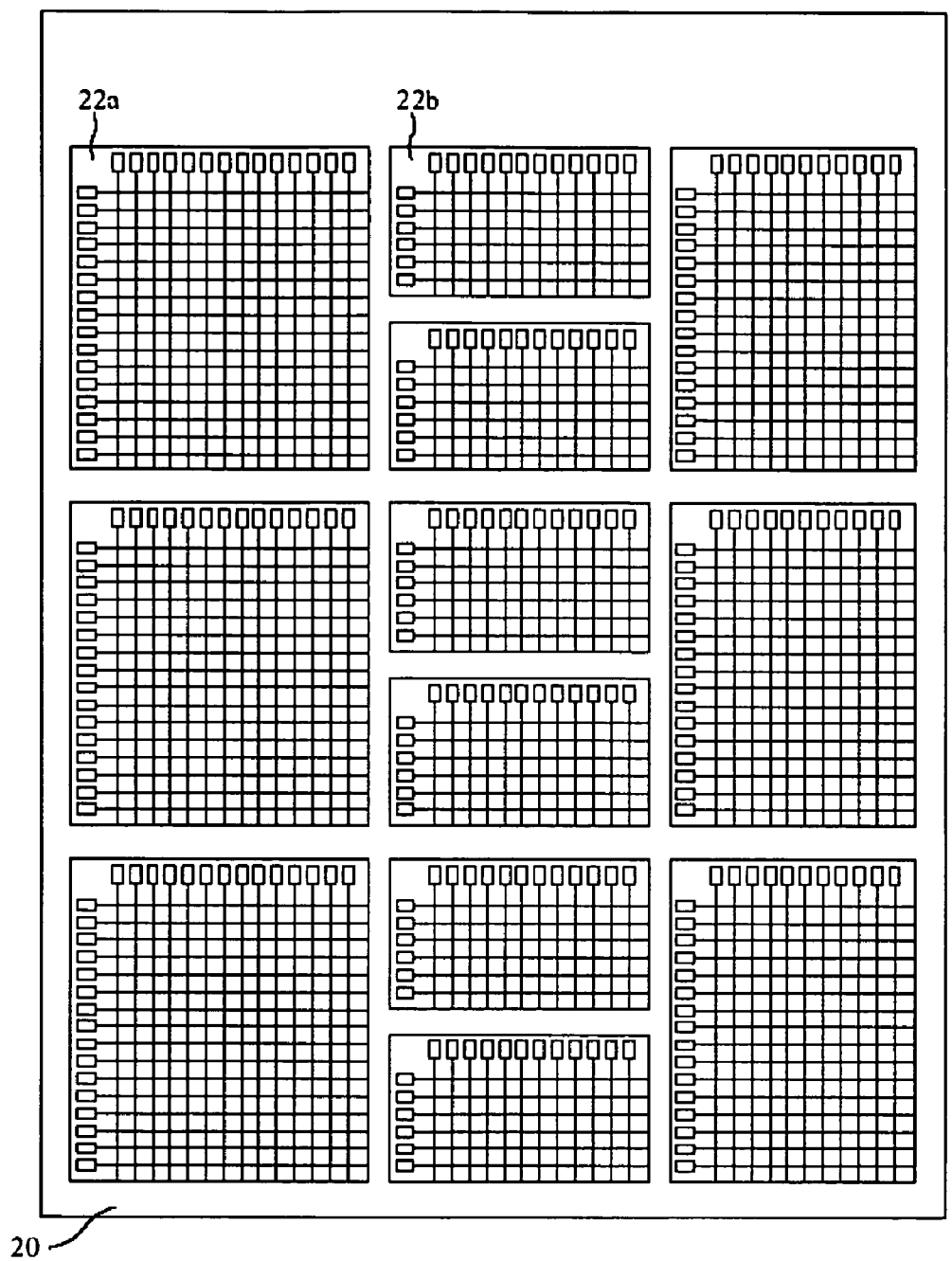
FIG. 2 is a layout for LCD panels on a substrate in the prior art.
Figure 3:
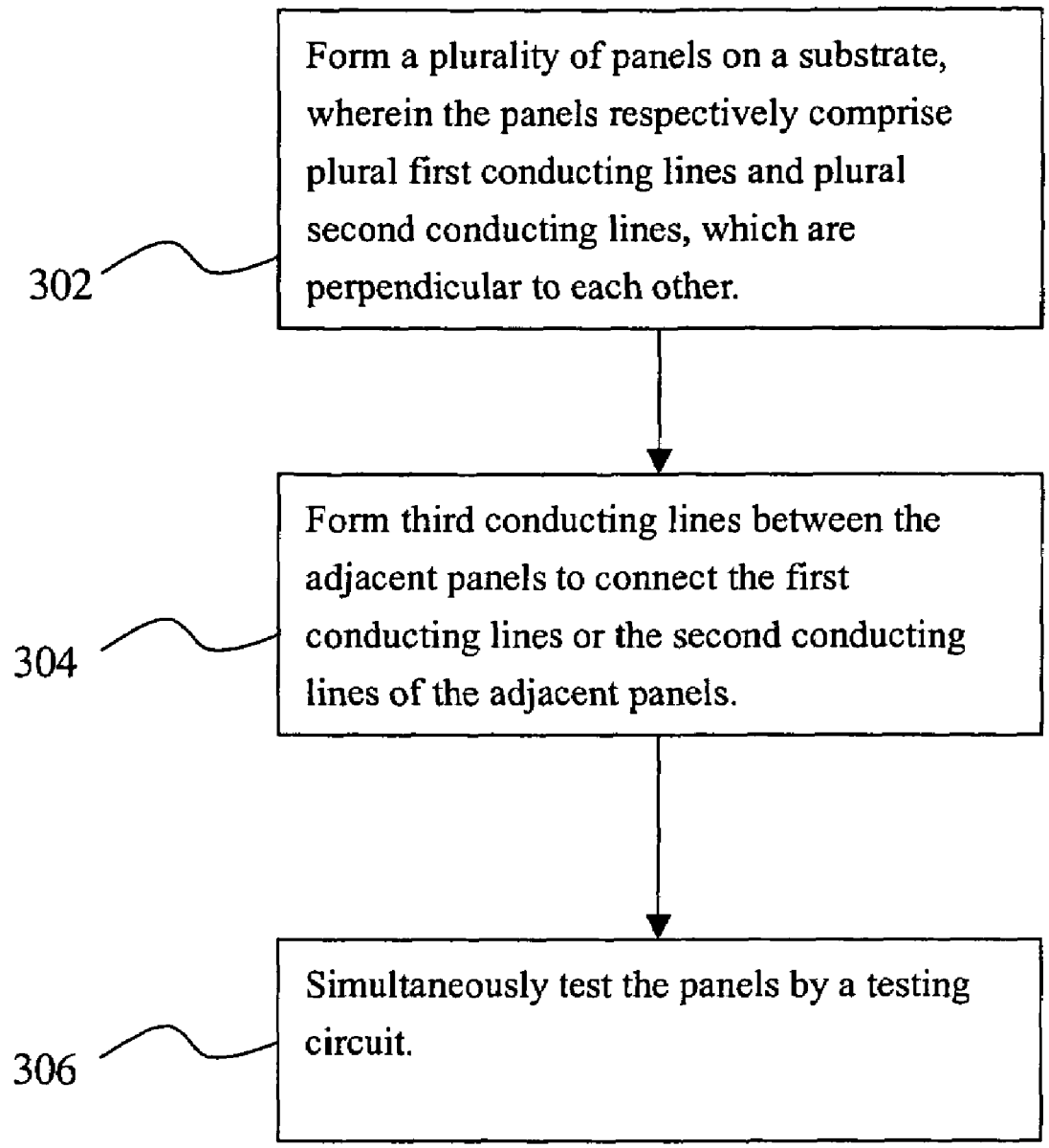
FIG. 3 is a flowchart showing a testing method for LCD panels according to an embodiment of the present invention.

FIG. 3 shows a flowchart of a testing method for LCD panels according to an embodiment of the present invention. In step 302, a plurality of panels are formed on a substrate, e.g. a glass substrate, wherein the panels respectively comprise plural first conducting lines and plural second conducting lines, which are perpendicular to each other. In step 304, third conducting lines are formed between the adjacent panels to connect the first conducting lines or the second conducting lines of the adjacent panels. Finally, in step 306, all panels on the substrate are tested by a testing circuit simultaneously.

Figure 4:
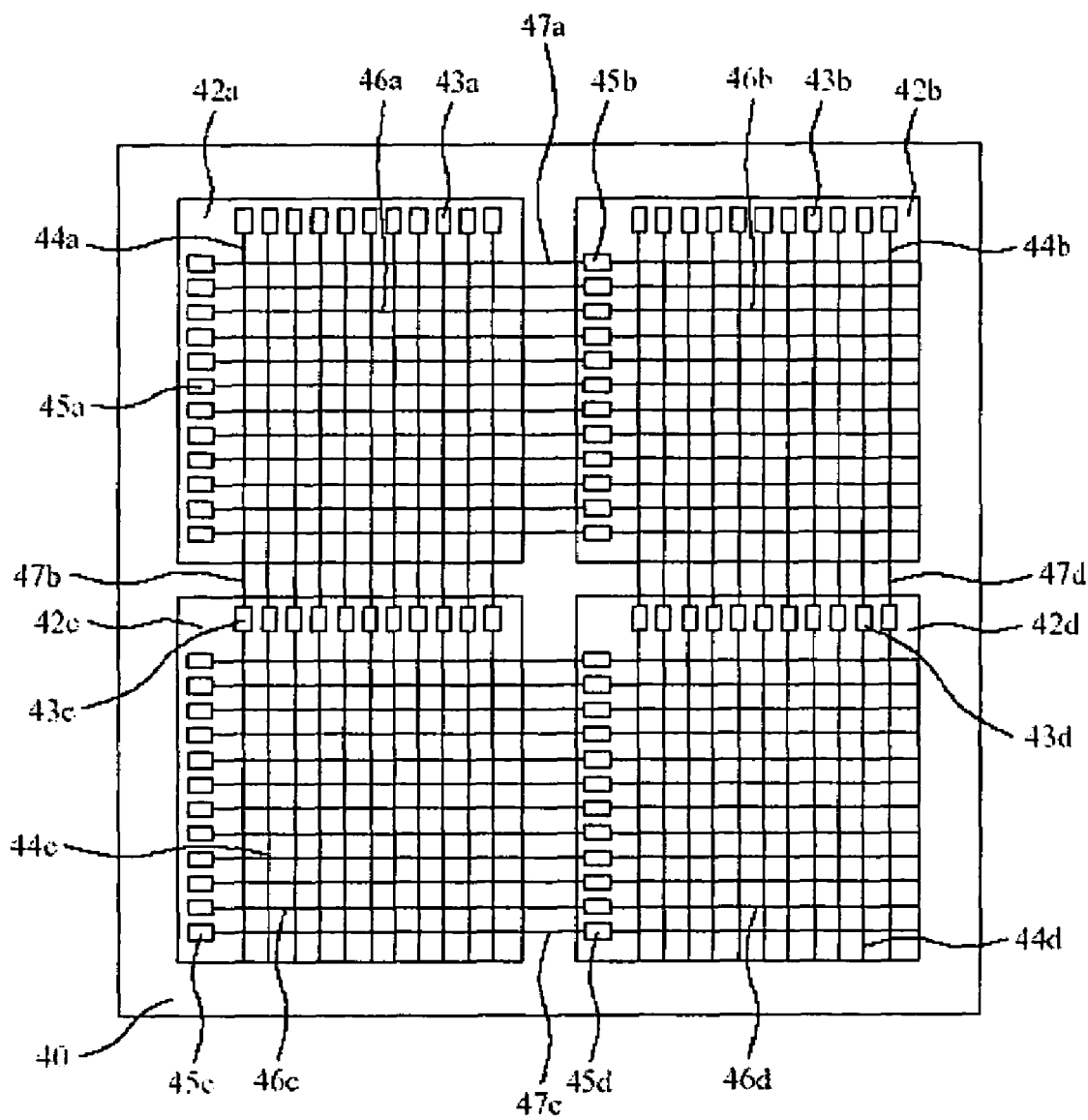
FIG. 4 is a layout for LCD panels according to one preferred embodiment of this invention.

FIG. 4 is a preferred embodiment of the present invention which shows a layout of LCD panels. According to the testing method of the present invention for LCD panels, four same-sized panels, i.e. 42a, 42b, 42c and 42d, are formed on the glass substrate 40. Each panel 42a, 42b, 42c and 42d, comprises many vertical source lines 44a, 44b, 44c and 44d, and many horizontal gate lines 46a, 46b, 46c and 46d. Moreover, the left-hand side of each row of the gate lines 46a, 46b, 46c and 46d comprises gate pads 45a, 45b, 45c and 45d. The top of each column of the source lines 44a, 44b, 44c and 44d comprises source pads 43a, 43b, 43c, and 43d.

After forming the panels 42a, 42b, 42c and 42d the gate lines of the horizontally adjacent panels are electrically connected. For example, the gate lines 46a of the panel 42a are electrically connected with the gate pads 45b of the horizontally adjacent panel 42b by the conducting lines 47a. The gate lines 46c of the panel 42c are electrically connected with the gate pads 45d of the horizontally adjacent panel 42d by the conducting lines 47c.

Similarly, the source lines of the vertically adjacent panels are electrically connected. For example, the source lines 44a of panel 42a are electrically connected with the source pads 43c of the vertically adjacent panel 42c by the conducting lines 47b. The source lines 44b of panel 42b are electrically connected with the source pads 43d of the vertically adjacent panel 42d by the conducting lines 47d.

That is, through the conducting lines 47a and 47c, the gate lines of the horizontally adjacent panels 42a and 42b are electrically connected, and the gate lines of the horizontally adjacent panels 42c and 42d are electrically connected. Meanwhile, through the conducting lines 47b and 47d, the source lines of the vertically adjacent panels 42a and 42c are electrically connected, and the source lines of the vertically adjacent panels 42b and 42d are electrically connected. Afterward, when conducting the test on these four panels, one only needs a testing circuit with a size equal to the total area of the four panels to simultaneously test the four panels.

The testing circuit comprises, in the vertical direction, testing pins of which the total number and position correspond to those of the gate pads 45a and 45c; and in the horizontal direction, testing pins of which the total number and position correspond to those of the source pads 43a and 43b. By electrically connecting the testing pins to the plural source pads of the source lines and to the plural gate pads of the gate lines, all the source lines and the gate lines of the four panels can be simultaneously tested.

Figure 5:
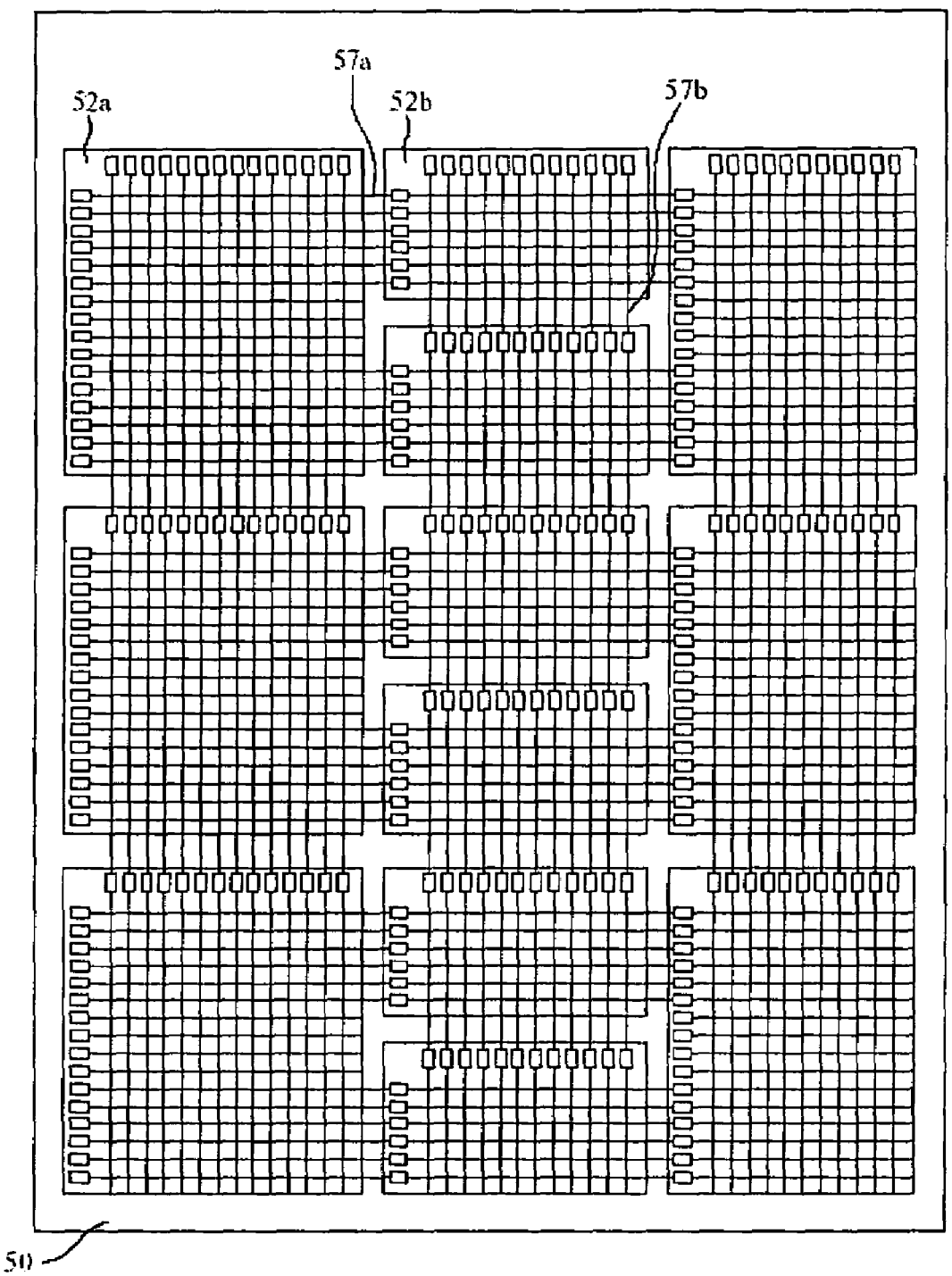
FIG. 5 is a layout for LCD panels according to another preferred embodiment of this invention.

When a glass substrate comprises different sizes of panels, the testing method of the present invention can dramatically reduce the testing time. FIG. 5 illustrates a panel layout according to another preferred embodiment of the present invention. Glass substrate 50 comprises several large panels 52a and small panels 52b. According to the testing method of the present invention, the different sizes of the panels on the glass substrate 50, i.e. the large panel 52a and the small panel 52b, can be tested simultaneously merely by electrically connecting the gate lines of the horizontally adjacent panels by the conducting lines 57a and electrically connecting the source lines of the vertically adjacent panels by the conducting lines 57b. The use of different-sized testing circuits is not necessary.

According to the testing method of the present invention for LCD panels, one can simultaneously test the panels having the same or different sizes and thereby simplify the test, reduce the time for moving the testing circuit, shorten the testing and manufacturing time, raise the production rate and yield, and lower the cost for testing facilities.

The preferred embodiments of the present invention described above should not be regarded as limitations to the present invention. It will be apparent to those skilled in the art that various modifications and variations can be made to the present invention without departing from the scope or spirit of the invention. The scope of the present invention is as defined in the appended claims.

What is claimed is:

1. A testing method for liquid crystal display panels, the testing method comprising:
   forming a plurality of panels on a substrate, wherein the panels respectively include plural first conducting lines and plural second conducting lines, which are perpendicular to each other;
   forming plural third conducting lines between the adjacent panels to directly connect the first conducting lines or the second conducting lines of the adjacent panels in a straight direction; and
   testing the panels simultaneously.

2. The testing method for liquid crystal display panels of claim 1, wherein the first conducting lines are plural source lines.

3. The testing method for liquid crystal display panels of claim 1, wherein the second conducting lines are plural gate lines.

4. The testing method for liquid crystal display panels of claim 1, wherein the substrate is a glass substrate.

5. The testing method for liquid crystal display panels of claim 1, wherein the testing step is performed by a testing circuit.

6. The testing method for liquid crystal display panels of claim 5, wherein the size of the testing circuit is the same as the total area of the panels.

7. The testing method for liquid crystal display panels of claim 5, wherein the testing circuit comprises plural testing pins.

8. The testing method for liquid crystal display panels of claim 7, wherein the testing pins electrically connect to plural source pads of the source lines and to plural gate pads of the gate lines in the testing step.

9. The testing method for liquid crystal display panels of claim 1, wherein the sizes of the panels are the same.

10. The testing method for liquid crystal display panels of claim 1, wherein the panels comprise at least two different sizes.

11. A layout for testing liquid crystal display panels on a substrate simultaneously, the layout comprising:
    panels located on the substrate, the panels including first conducting lines and second conducting lines, wherein the second conducting lines are perpendicular to the first conducting lines; and
    third conducting lines, which are located between the adjacent panels to directly connect the first conducting lines or the second conducting lines of the adjacent panels in a straight direction.

12. The layout for testing liquid crystal display panels on a substrate simultaneously of claim 11, wherein the first conducting lines are plural source lines.

13. The layout for testing liquid crystal display panels on a substrate simultaneously of claim 11, wherein the second conducting lines are plural gate lines.

14. The layout for testing liquid crystal display panels on a substrate simultaneously of claim 11, wherein the substrate is a glass substrate.

15. The layout for testing liquid crystal display panels on a substrate simultaneously of claim 11, wherein the sizes of the panels are the same.

16. The layout for testing liquid crystal display panels on a substrate simultaneously of claim 11, wherein the panels comprise at least two different sizes.

17. The layout for testing liquid crystal display panels on a substrate simultaneously of claim 11, wherein the testing step is performed by a testing circuit.

18. The layout for testing liquid crystal display panels on a substrate simultaneously of claim 17, wherein the size of the testing circuit is the same as the total area of the panels.

19. The layout for testing liquid crystal display panels on a substrate simultaneously of claim 17, wherein the testing circuit comprises plural testing pins.

20. The layout for testing liquid crystal display panels on a substrate simultaneously of claim 19, wherein the testing pins electrically connect to plural source pads of the source lines and to plural gate pads of the gate lines in the testing step.

* * * * *